United States Patent
Gamberg

(10) Patent No.: US 6,356,832 B1
(45) Date of Patent: Mar. 12, 2002

(54) ANTI-LOCK BRAKE CONTROL SYSTEM HAVING ENHANCED STRAIGHTLINE BRAKING EFFICIENCY

(75) Inventor: Eric M. Gamberg, Ann Arbor, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/723,457

(22) Filed: Nov. 28, 2000

(51) Int. Cl.[7] ................................................ B60T 8/00
(52) U.S. Cl. ........................ 701/71; 701/73; 701/78; 701/82; 303/121; 180/197
(58) Field of Search .................. 701/70, 71, 72, 701/73, 74, 78, 82, 83; 180/197; 303/121, 122.03, 122.06

(56) References Cited

U.S. PATENT DOCUMENTS

| | | | |
|---|---|---|---|
| 4,477,124 A | 10/1984 | Watanabe | 303/100 |
| 4,591,213 A | 5/1986 | Rapoport | 303/93 |
| 4,653,816 A | 3/1987 | Lin | 303/106 |
| 4,718,685 A * | 1/1988 | Kawabe et al. | 280/91 |
| 4,855,916 A * | 8/1989 | Bernard | 701/71 |
| 5,000,281 A | 3/1991 | Nobumoto et al. | 180/197 |
| 5,136,508 A | 8/1992 | Bannon et al. | 364/426.01 |
| 5,140,524 A | 8/1992 | Matsuda | 364/426.02 |
| 5,329,453 A | 7/1994 | Tsuyama et al. | 364/426.02 |
| 5,524,974 A | 6/1996 | Fischle et al. | 303/191 |
| 5,613,744 A | 3/1997 | Eslinger et al. | 303/191 |
| 5,731,975 A | 3/1998 | Nakashima | 364/426.028 |
| 6,012,783 A | 1/2000 | Schwarzer et al. | 303/140 |
| 6,195,606 B1 * | 2/2001 | Barta et al. | 701/70 |

* cited by examiner

Primary Examiner—Yonel Beaulieu
(74) Attorney, Agent, or Firm—Gregory P. Brown; William J. Coughlin

(57) ABSTRACT

An anti-lock brake control system 12 for a vehicle 10 that enhances vehicle braking when the vehicle is commanded to travel in a substantially straight trajectory. The brake control system 12 has an operator input 18 for commanding vehicle braking, and brake actuators 20A–20C for applying braking force to wheels 14A–14D in response to the operator input. In addition, the brake control system includes a steering angle sensor 34 for sensing a steering angle of the vehicle, and a wheel speed sensors 36 for sensing rotational speed of the wheels. Further, the brake control system 12 includes a controller 22 for controlling the amount of braking by the brake actuators 20A–20C in accordance with a tire slip as determined by the wheel speed. The controller 22 determines the amount of tire slip during braking and increases the amount of tire slip to increase vehicle braking when the vehicle 10 is commanded to travel in a substantially straight-line trajectory.

19 Claims, 3 Drawing Sheets

ANTI-LOCK BRAKE CONTROL SYSTEM HAVING ENHANCED STRAIGHTLINE BRAKING EFFICIENCY

FIELD OF THE INVENTION

The present invention generally relates to vehicle braking and, more particularly, to an anti-lock brake control system.

BACKGROUND OF THE INVENTION

Many automotive vehicles are equipped with an anti-lock brake system (ABS) which modulates the brake force actuation to control the amount of tire slip between the tire and the road surface, in order to maintain stability of the vehicle during braking. Conventional brake systems generate a braking force at the wheels of the vehicle, in response to the vehicle operator depressing a brake pedal, which, in turn, resists rotation of the wheels and creates a deceleration force at the tire and driving surface interface. If the tire slips beyond a certain amount, the braking force between the tire and the driving surface is controlled to reduce the tire slip on the driving surface so as to maintain vehicle stability during vehicle braking. As each tire approaches or exceeds the peak of a mu-slip curve, electronic control is employed to maintain lateral force generating potential. As the tire slip rate increases past the peak on the slip curve, the wheels may lock up, thereby creating possible vehicle instability.

Typical anti-lock brake systems prevent the wheels from locking by reducing the brake force applied to the wheels by modulating the brake force. As a consequence, the brake force is repeatedly increased and decreased in a cyclical fashion. In order to maintain stability of the vehicle, most anti-lock brake systems do not maximize vehicle braking. Instead, current anti-lock brake control systems limit tire slip during straightline bEing to the detriment of decreased stopping distances, in case the driver should command a change in direction (i.e. yaw) as occurs when the steering wheel is turned.

Accordingly, there is a need for an anti-lock brake control system in a vehicle that enhances the vehicle braking to maximize vehicle braking capabilities, particularly when the vehicle is concurrently commanded to travel in a straightline trajectory.

SUMMARY OF THE INVENTION

In accordance with the teachings of the present invention, an anti-lock brake control system is provided for a vehicle having a wheel and a brake for applying braking force to the wheel in response to an operator brake command input. The brake control system includes an operator input for commanding vehicle braking, and a brake actuator for applying braking force to the wheel in response to the operator input. In addition, the control system includes a steering angle sensor for sensing a steering angle, and a wheel speed sensor for sensing rotational speed of the wheel. Further, the brake control system includes a controller for controlling the amount of brake force applied by the brake actuator in accordance with a tire slip as determined by the sensed wheel speed. The controller determines the tire slip during braking and increases the tire slip to increase vehicle braking when the vehicle is commanded to travel in a substantially straight line. Accordingly, the brake control system of the present invention optimizes vehicle braking when the vehicle is commanded to travel in a substantially straight line.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
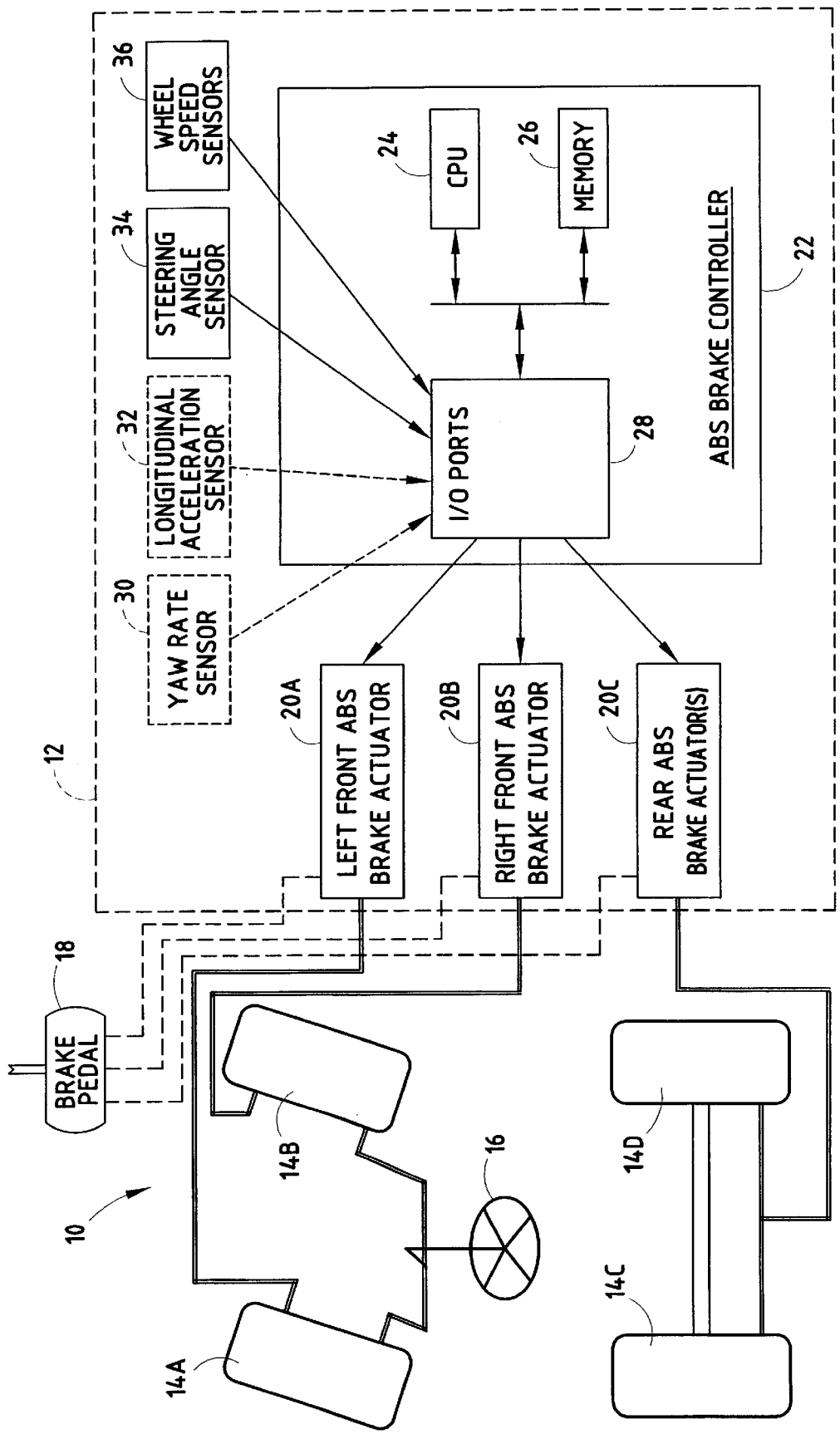
FIG. 1 is a block diagram illustrating a vehicle having an anti-lock brake control system according to the present invention.

Referring to FIG. 1, an automotive vehicle is generally depicted by reference numeral 10 and is equipped with an anti-lock brake control system 12 according to the present invention. The brake control system 12 controls the braking force applied by an anti-lock brake system to one or more vehicle wheels so as to optimize vehicle braking during commanded straightline vehicle travel. The brake control system 12 of the present invention senses the presence of a straightline driving command and automatically optimizes vehicle braking during a braking event by increasing the tire slip (or average tire slip) closer toward the peak of the mu-slip curve.

The vehicle 10 is shown having a pair of front tires 14A and 14B, and a pair of rear tires 14C and 14D. Each of tires 14A–14D is mounted on a corresponding wheel as is well-known in the art. The vehicle is also equipped with a brake pedal 18 that is depressible, by the driver of the vehicle, to command a vehicle braking event. In a hydraulic-actuated brake system, a master cylinder generates hydraulic fluid pressure in response to the brake command input. The pressurized hydraulic fluid, in turn, applies a braking force via brake actuators to brake friction members, such as disc or drum brakes, to resist rotation of the wheels associated with the corresponding tires 14A–14D.

The anti-lock brake control system 12 includes a left front ABS brake actuator 20A, and a right front ABS brake actuator 20B for independently applying braking force to the corresponding front tires 14A and 14B, respectively. In addition, a rear ABS brake actuator 20C is provided for applying braking force to each of the rear tires 14C and 14D. It should be appreciated that the rear ABS brake actuator 20C may include a single brake actuator shared commonly by both tires 14C and 14D, or may include separate independent ABS brake actuators for each of tires 14C and 14D, similar to brake actuators 20A and 20B.

The anti-lock brake control system 12 further includes an ABS brake controller 22 for controlling the braking operation, including adjusting the braking force applied to the tires 14A–14D. The brake controller 22 preferably includes a microprocessor and memory for storing and processing one or more brake control algorithms. The controller hardware may include a commercially available controller. In particular, controller 22 includes input/output (I/O) ports 28, a central processing unit (CPU) 24, and memory 26. The controller 22 receives various sensed signals from sensors, as shown, and, in response to the brake control algorithm(s), generates output control signals to each of brake actuators 20A–20C.

The brake controller 22 receives a s ed steering angle signal from a steering angle sensor 34, and sensed wheel speed signals from wheel speed sensors 36 associated with each of the wheels/tires 14A–14D. The sensed steering angle signal provides an indication as to whether the steering wheel is turned, relative to a straightline vehicle trajectory, so as to command the vehicle to turn (yaw). A steering angle turn event is established whenever the road wheel angle deviates from the straightline vehicle trajectory by a designated amount such as two degrees. Accordingly, the vehicle is determined to be traveling in a straight line provided the steering angle is such that the road wheel angle is within the designated range.

In addition, brake controller 22 may further receive a sensed yaw signal from a yaw rate sensor 30, and a sensed longitudinal acceleration signal from a longitudinal acceleration sensor 32. The yaw rate sensor provides a yaw signal which indicates whether or not the vehicle is yawing, independent of whether the steering wheel is turned. If all vehicle wheels are operating at high slip rates while the vehicle is still moving, it can be difficult to accurately determine vehicle speed. The longitudinal acceleration signal 32 provides a means to determine more accurate vehicle speed during a braking event, particularly when tire slip occurs. Preferably, the longitudinal acceleration sensor 32 is a biaxial sensor that is capable of inferring vehicle pitch angle to the force of gravity in addition to vehicle deceleration.

Figure 2:
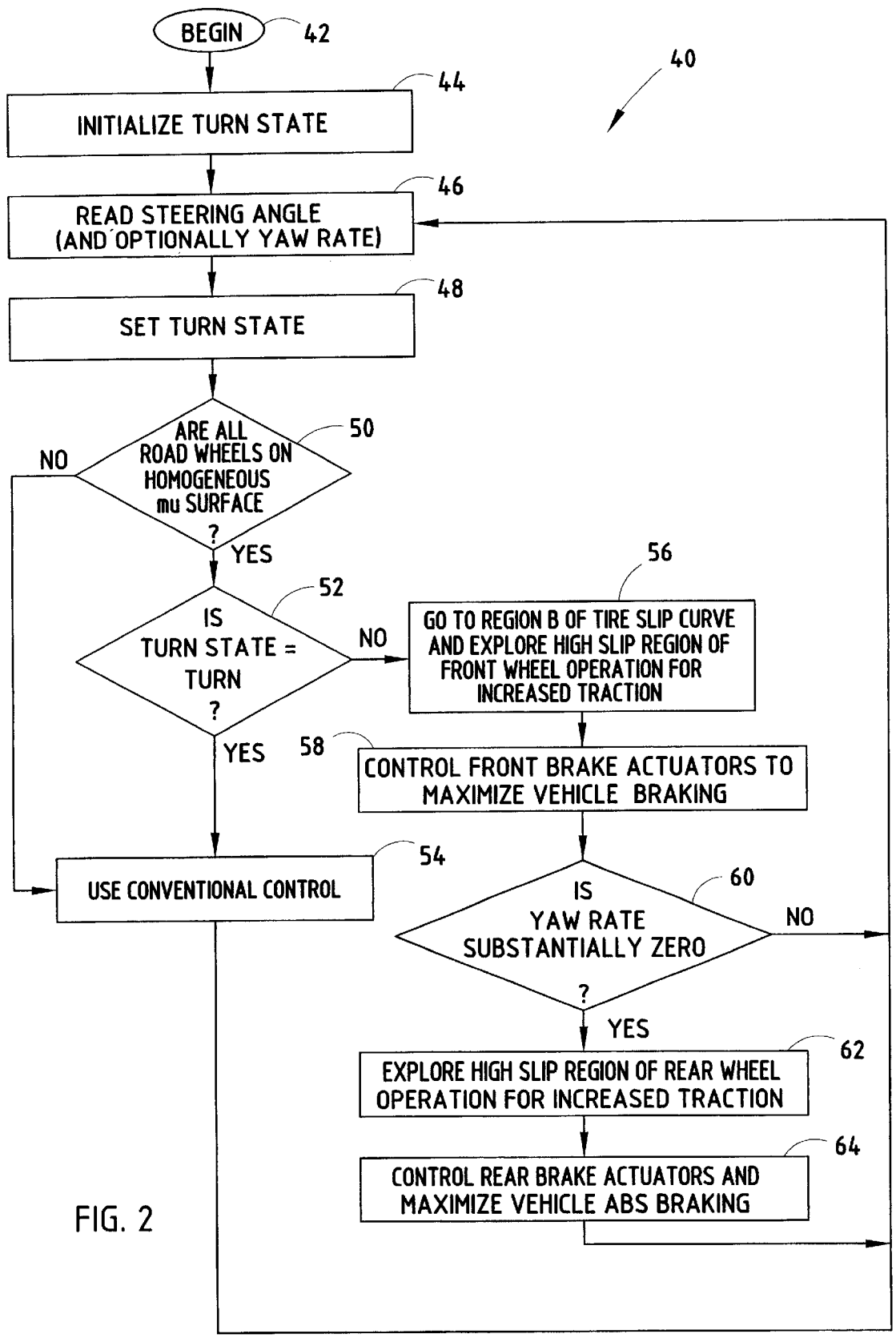
FIG. 2 is a flow diagram illustrating a method of controlling the anti-lock brake control system to optimize vehicle braking during a straightline travel command according to the present invention.

The ABS brake controller 22 is programmed in memory 26 to perform a brake control methodology 40 according to the present invention, as shown in FIG. 2. The brake control methodology 40 begins at step 42 and proceeds to step 44 to initialize the turn state. The turn state initialization occurs at vehicle startup. Next, the sensed steering angle, and, if available, the sensed yaw rate, as sensed by sensors 34 and 30, respectively, are read into memory in step 46. Next, in step 48, the turn state is set which includes checking sensor states over a time period to verify that the steering angle measurement is accurate enough to determine if the vehicle is commanded to travel in a substantially straight line.

Once the turn state is set, brake control methodology 40 proceeds to decision step 50 to check if all road wheels are on a homogenous mu surface. If all road wheels are not on a homogenous mu surface, indicative that the road surface varies such as having one or more wheels on a dirt shoulder and one or more wheels on a paved road, for example, conventional ABS control is employed in step 54, before returning back to step 46. If all road wheels are determined to be on a homogenous mu surface, brake control methodology 40 proceeds to decision step 52 to check if the turn state is determined to be equal to a turn event. The turn state indicates whether the vehicle is commanded to turn as determined by the sensed steering angle signal indicating a straightline travel command. If the vehicle is determined to be commanded to turn, brake control methodology 40 uses the conventional ABS brake control in step 54, before returning back to step 46.

Figure 3:
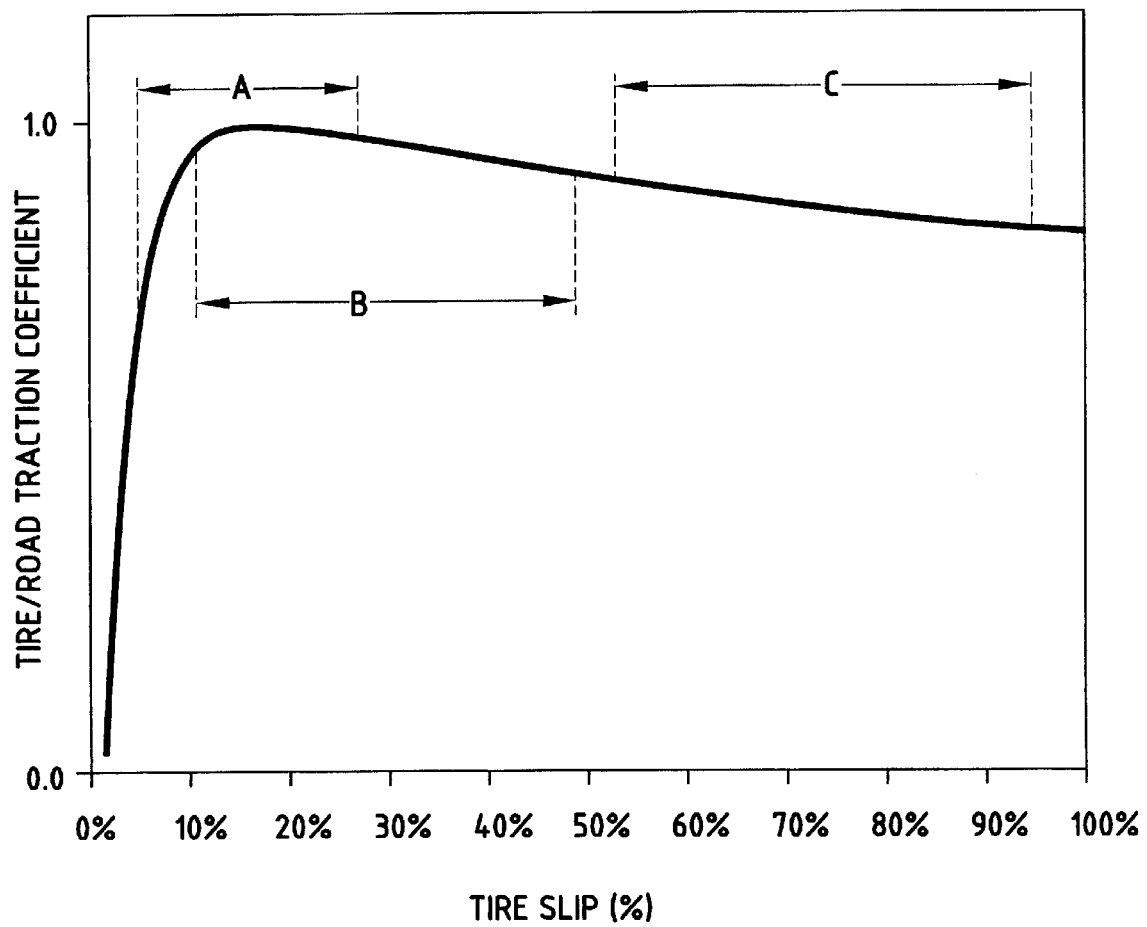
FIG. 3 is a graph illustrating a typical mu-slip curve and multiple regions of control for controlling vehicle braking.

If it is determined that the vehicle is not commanded to turn, but instead is commanded to travel in a substantially straight trajectory, brake control methodology 40 proceeds to step 56 to change brake control from a first low region of the slip curve, such as region A, to a second higher region of the slip curve, such as region B, as is shown in FIG. 3, according to one example. Once in the second higher region B of the slip curve, the brake control methodology 40 explore the higher slip region of front wheel operation for potential increased traction. By moving from the first lower region A to the second higher region B of the slip curve during substantially straightline vehicle travel, the vehicle braking can be optimized, and even maximized. Accordingly, in step 58, brake control methodology 40 may control the front brake actuators to maximize vehicle braking in response to the steering angle sensed signal.

Proceeding to decision step 60, brake control methodology 40 checks for whether the sensed yaw rate is substantially zero and, if not, returns to step 46. According to one embodiment, the yaw rate is substantially zero provided that sensed yaw rate is of an amount less than two degrees per second (2° /sec.). If the yaw rate is substantially equal to zero, methodology 40 proceeds to step 62 to explore the high slip region of the rear wheel operation for increased traction. In step 64, the rear brake actuator(s) are controlled to optimize, and even maximize, rear wheel vehicle braking. Accordingly, the yaw rate signal may be employed to further allow for control of the rear wheels of the vehicle when it is determined that the vehicle is not undergoing a yaw. Following control of the rear brake actuators, brake control methodology 40 returns to step 46.

Accordingly, the brake control system 12 of the present invention automatically controls the amount of braking force so as to optimize vehicle braking when the vehicle is commanded to travel in a substantially straight line. The brake control is accomplished by the controller changing from a low region A of the slip curve to an increased region B of the slip curve as shown in FIG. 3, which allows for an increased tire slip rate during straightline travel of the vehicle. When the steering angle indicates that the vehicle is commanded to turn, it should be appreciated that the brake control returns to the lower brake region A, or an alternative, yet lower region, to decrease the tire slip rate. Also shown in FIG. 3 is region C, which may be employed with further increased tire slip rates to control braking based on temperature as is disclosed in a co-filed and commonly assigned patent application Ser. No. 09/723,465 entitled "ANTI-LOCK BRAKE CONTROL SYSTEM TO REDUCE THERMAL LOAD."

It should be appreciated that the brake control system 12 of the present invention is particularly well-suited for use on anti-lock brake control systems where the vehicle braking can be adjusted electronically. While the brake control system 12 may be employed with a hydraulic-actuated brake system, an electromechanical-actuated braking system, or other types of braking actuators may be employed without departing from the spirit of the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. An anti-lock brake control system for a vehicle having a wheel and a brake for applying braking force to the wheel in response to an operator brake command input, said brake control system comprising:

an operator input for commanding vehicle braking;

a brake actuator for applying braking force to the wheel in response to the operator input;

a steering angle sensor for sensing a steering angle of the vehicle;

a wheel speed sensor for sensing rotational speed of said wheel; and a controller for controlling the amount of braking force applied by the brake actuator in accordance with a tire slip as determined by the sensed wheel speed, said controller determining the tire slip during braking and increasing the tire slip to increase vehicle braking when said vehicle is commanded to travel in a substantially straight line.

2. The brake control system as defined in claim 1, wherein said controller increases the tire slip rate when said steering wheel angle indicates that the vehicle is commanded to travel in a substantially straight line.

3. The brake control system as defined in claim 1, wherein said controller increases vehicle braking by shifting from a first region of a tire slip curve to a second higher region of the tire slip curve.

4. The brake control system as defined in claim 1, wherein said controller controls one or more front brake actuators to increase vehicle braking.

5. The brake control system as defined in claim 4, wherein said controller further receives a yaw rate signal, said controller increasing the tire slip for a rear wheel brake actuator based on said yaw rate signal to increase vehicle braking via a rear wheel.

6. The brake control system as defined in claim 5, wherein said controller further receives a longitudinal acceleration signal, wherein said controller determines vehicle speed as a function of said longitudinal acceleration signal.

7. An anti-lock brake control system for a vehicle having a wheel and a brake actuator for applying braking force to the wheel in response to an operator brake command input, said brake control system comprising:

a steering angle sensor for sensing a steering angle of the vehicle;

a wheel speed sensor for sensing rotational speed of said wheel; and a controller for controlling the amount of braking force applied by the brake actuator in accordance with a tire slip as determined by said sensed wheel speed, said controller increasing the tire slip to increase vehicle braking when said vehicle is commanded to travel in a substantially straight line.

8. The brake control system as defined in claim 7, wherein said controller determines that the vehicle is commanded to travel in a substantially straight line based on the sensed steering angle.

9. The brake control system as defined in claim 7, wherein said controller increases vehicle braking by shifting from a first region of a tire slip curve to a second higher region of a tire slip curve.

10. The brake control system as defined in claim 7, wherein said controller controls one or more front brake actuators to increase vehicle braking.

11. The brake control system as defined in claim 10, wherein said controller further receives a yaw rate signal, said controller increasing the tire slip for a rear wheel brake actuator based on said yaw rate signal to increase vehicle braking via a rear wheel.

12. The brake control system as defined in claim 7, wherein said controller further receives a longitudinal acceleration signal, wherein said controller determines vehicle speed as a function of said longitudinal acceleration signal.

13. A method for controlling an anti-lock brake system for a vehicle having a wheel and a brake for applying braking force to the wheel in response to an operator brake command input, said method comprising the steps of:

sensing a steering angle of the vehicle;

sensing rotational speed of said wheel;

sensing an operator input for commanding vehicle braking;

applying braking force to said wheel in response to said operator input;

determining a tire slip based on said sensed wheel speed during said vehicle braking force;

increasing the tire slip to increase vehicle braking when said vehicle is commanded to travel in a substantially straight line.

14. The method as defined in claim 13 further comprising the step of determining when said vehicle is commanded to travel in a substantially straight line based on said sensed steering angle.

15. The method as defined in claim 14, wherein said step of determining when said vehicle is commanded to travel in a substantially straight line includes sensing when said wheel is turned at an angle of less than two degrees relative to a straight line.

16. The method as defined in claim 13, wherein said step of increasing the tire slip includes shifting from a first region in the tire slip curve to a second higher region of the tire slip curve.

17. The method as defined in claim 13, wherein said step of applying braking force includes applying braking force to one or more front brake actuators to increase vehicle braking.

18. The method as defined in claim 17 further comprising the step of receiving a yaw rate signal and increasing the tire slip for a rear wheel brake actuator based on said yaw rate signal via a rear wheel.

19. The method as defined in claim 18 further comprising the steps of sensing longitudinal acceleration and determining vehicle speed as a function of said sensed longitudinal acceleration.

* * * * *